United States Patent Office.

JEAN JOSEPH AUGUSTE MOURIÉS, OF PHALSBOURG, FRANCE.

Letters Patent No. 107,088, dated September 6, 1870.

IMPROVEMENT IN PRESERVING BREAD.

The Schedule referred to in these Letters Patent and making part of the same

I, JEAN JOSEPH AUGUSTE MOURIÉS, of Phalsbourg, in the department of the Meurthe, in the Empire of France, have invented an Improved Process for Preserving Bread in a Reduced Bulk, of which the following is a specification.

Nature and Objects of the Invention.

Bread holds the first rank among the alimentary products supplied to us by the vegetable kingdom. This superiority is due, first, to the elementary composition of corn, which contains various substances, some capable of tranformation into blood and organized tissues, (gluten, albumen, caseine, and salts,) the others capable of sustaining and of produding animal heat, (starch, dextrine, glucose, and fat;) second, to the various mechanical and chemical operations to which wheat is submitted before its transformation into bread.

These operations are the cleaning, the grinding, the bolting, the kneading, the fermentation, and the baking, and they aid the functions of the organs of nutrition by eliminating inert matters and increasing the digestibility of the parts fit for sustaining animal life.

Fermentation plays a very important part in bread-making. It occasions a disengagement of carbonic acid, which raises the dough and produces in the bread numerous openings, facilitating the baking and rendering the crumb lighter. This operation requires great care, in order to obtain an aliment agreeable to the taste and easy of digestion.

Unfermented bread is heavy. The fluids of the mouth and of the œsophagus and the gastric juices penetrate it but slowly, and, therefore, the work of decomposition that takes place in the stomach is laborious.

Bread, in consequence of the water which it contains, will only keep for a few days. It is of large bulk, compared with the quantity of nutritious matter which it contains, and loses its form when packed tightly for carriage.

Bread-making requires a considerable plant, which a campaigning army, exposed to frequent and unforeseen movements, cannot encumber itself with, and this is also the case in maritime voyages and caravan journeys.

This precious food is, in such cases, replaced by biscuit, which is a very stiff paste, unfermented, flattened, and cut into cakes, that lose in baking and pressing not only the water which has served for the kneading, but also a part of the vegetation water of the flour.

This product is not cumbersome, is easily carried, and preserves for a length of time, but it only imperfectly replaces bread. It is very hard, difficult to masticate, does not become thoroughly impregnated with saliva, and fatigues the throat. It digests badly, and in certain cases its prolonged use may produce gastric disorders. Further, biscuit does not soak well, and must be broken into small pieces to make soup.

These considerations have led me to seek a means of dispensing with biscuit, while retaining bread as the staple food of soldiers, sailors, and travelers.

Starting from the principle that organic matters decompose under the influence of water and heat, I set myself to solve the following problem: First, render bread susceptible of long preservation by eliminating the water which it contains, without causing it to lose its alimentary properties; second, reduce its volume by compression.

I did not arrive at a satisfactory solution of this problem without much experimenting; nevertheless, the system of preparation which I have adopted is of the simplest, and is as follows:

General Description.

Choose well-made and well-baked bread, and expose it until complete siccity to dry currents of air. The evaporation should be slow, in order that the bread may not crack, and the duration of the desiccation varies from eight to fifteen days, according to the size of the loaves and the drying arrangement adopted.

If the bread were compressed in the state in which it is left by the desiccation, it would break, and to prevent this it must, before being pressed, be submitted, during four or five minutes, to a heat of from 150 to 200° centigrade, in a stove filled with steam.

To effect this operation, the bread is arranged in layers, separated by iron plates, which form molds to give the bread the shape and size previously determined upon. These layers are placed upon a cast-iron carriage, running upon rails, and are thus introduced into the stove, which is immediately closed. In a few minutes the bread becomes soft, although it will have absorbed but a very small quantity of water. The batch is then withdrawn, and pushed on a carriage between two pressing-plates, in order to be compressed. Any press will serve, but as the pressure should be rapid and powerful, the hydraulic press is the best.

The bread should remain in the press for twenty-four hours. It may then be removed, is dry and cold, and will preserve the shape which has been given to it.

Bread thus prepared should be put into cases to preserve it from the attacks of insects, and should be stored in places free from damp. It will thus keep good for several years.

This compressed bread has a nice color; it breaks vitreously; the teeth masticate it without effort; the fluids of the mouth penetrate it rapidly; it has an agreeable taste, and reaches the stomach without fatiguing the ingestion-canals; it digests well, and a piece of three ounces in weight, thrown into broth, will absorb, in three or four minutes, fifteen ounces of liquid, and swell considerably, the soup being all that can be desired.

The density of the bread is 0.5; if this degree is exceeded, the bread will be too hard.

I do not claim any particular apparatus, but use any which I may find suitable for any part of my process.

*Claim.*

I claim as my invention—

The process of preparing bread, by submitting it first to a slow drying, then to momentary contact with steam, and finally to a powerful compression, substantially as and for the purpose hereinbefore set forth.

J. J. A. MOURIÉS.

Witnesses:
LOUIS DUHANO,
  *Receveur du Domaines.*
ANTOINE REUTZ,
  *Médecin Aide-Major.*